April 11, 1944. H. T. TORNBERG 2,346,519
PLATEN PRESS
Filed Sept. 7, 1940 6 Sheets-Sheet 1
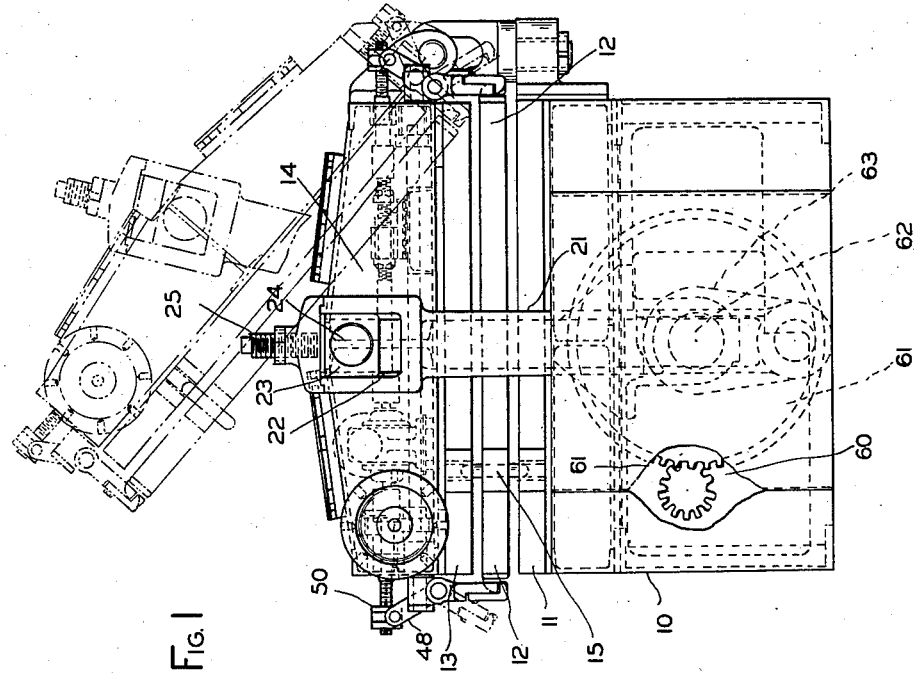
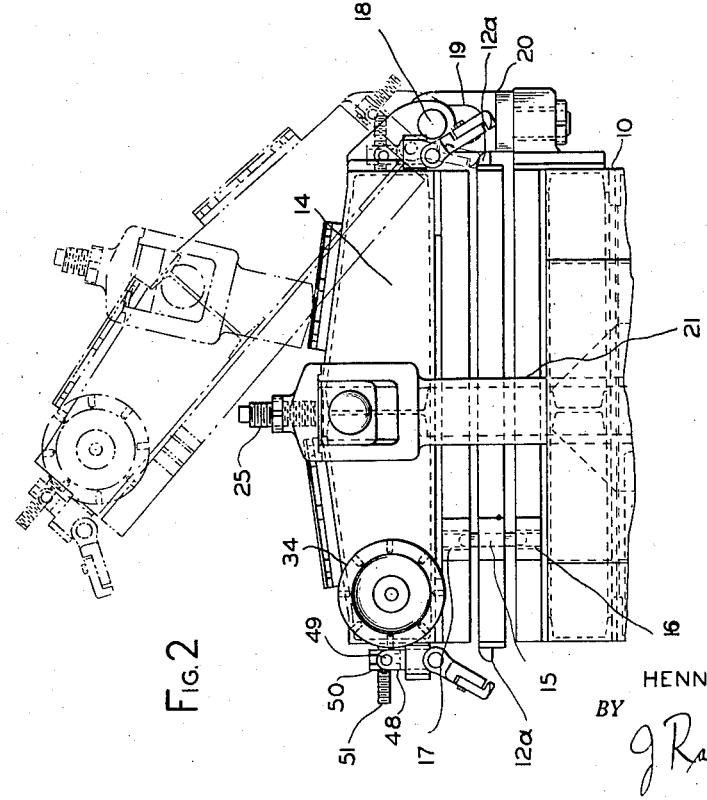
INVENTOR.
HENNING T. TORNBERG
BY
J Ralph Barrow

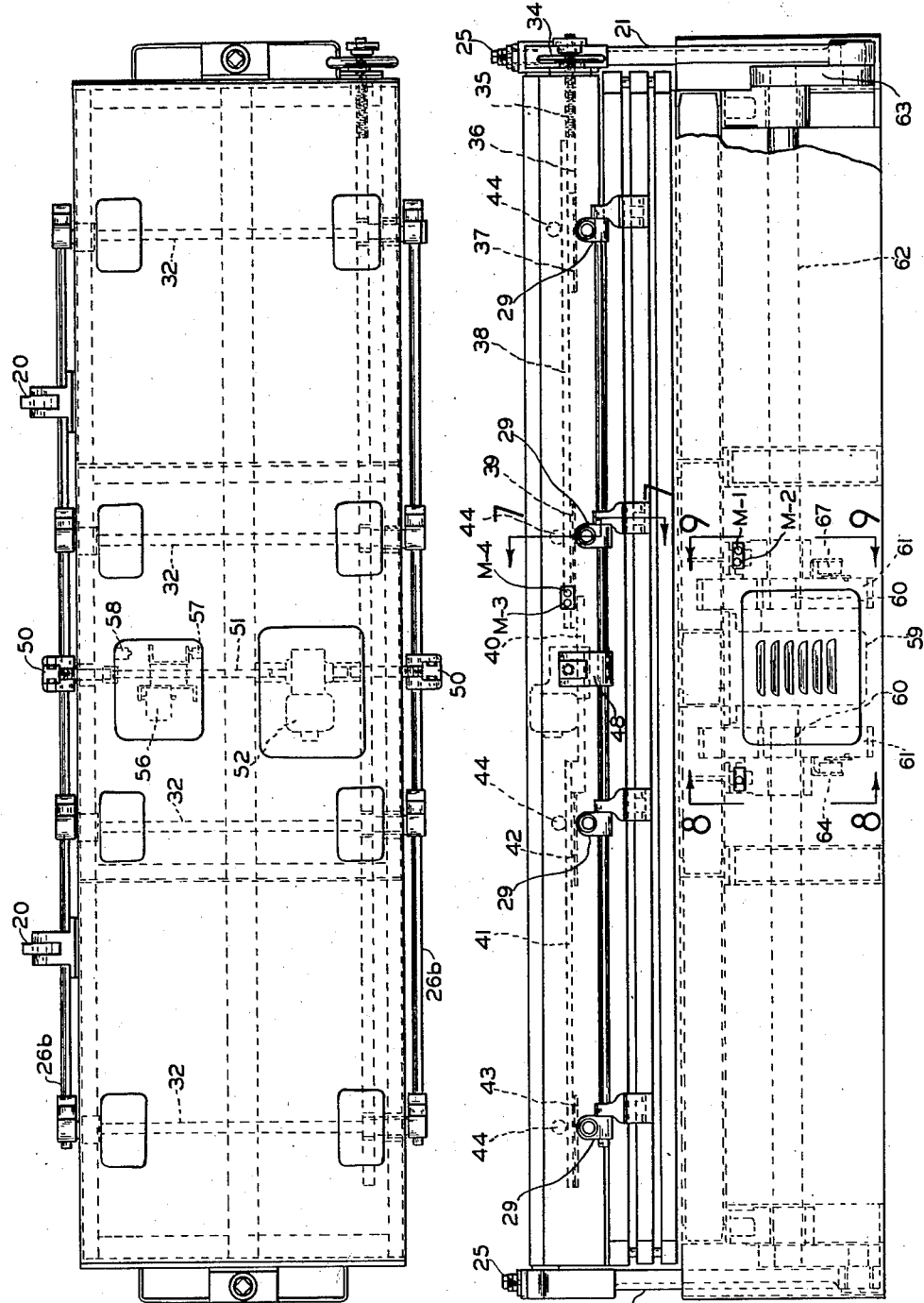

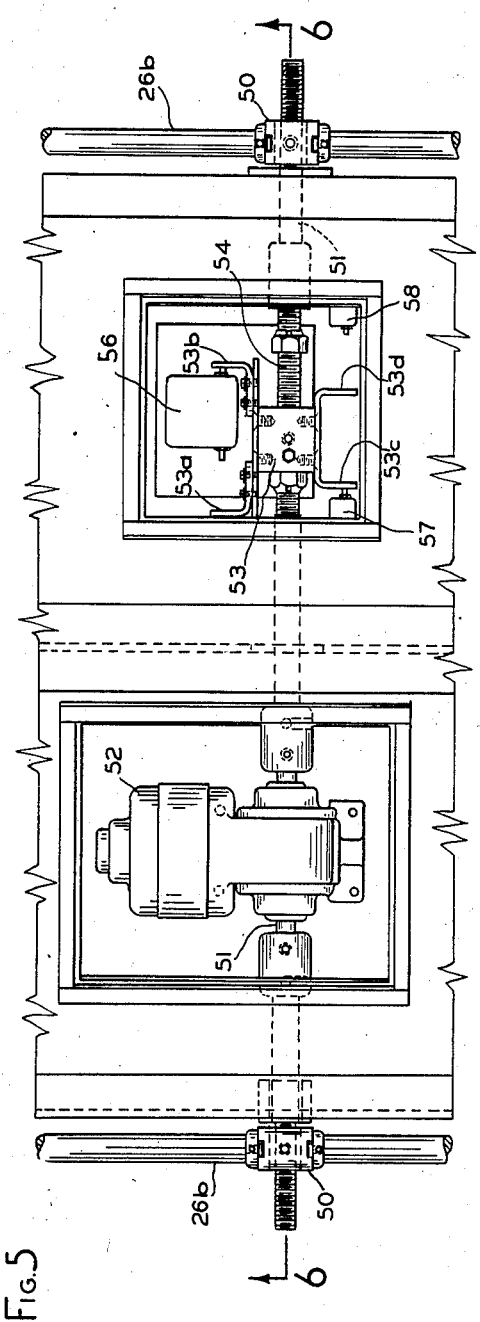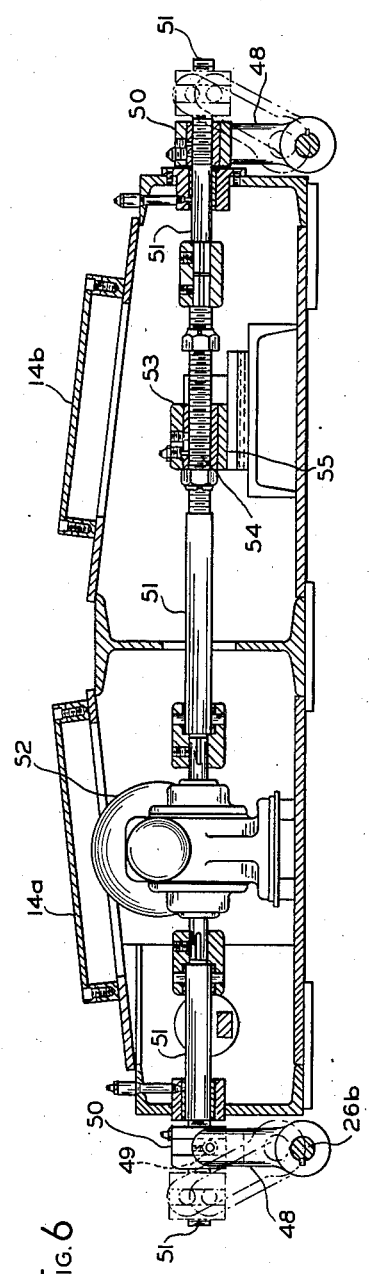

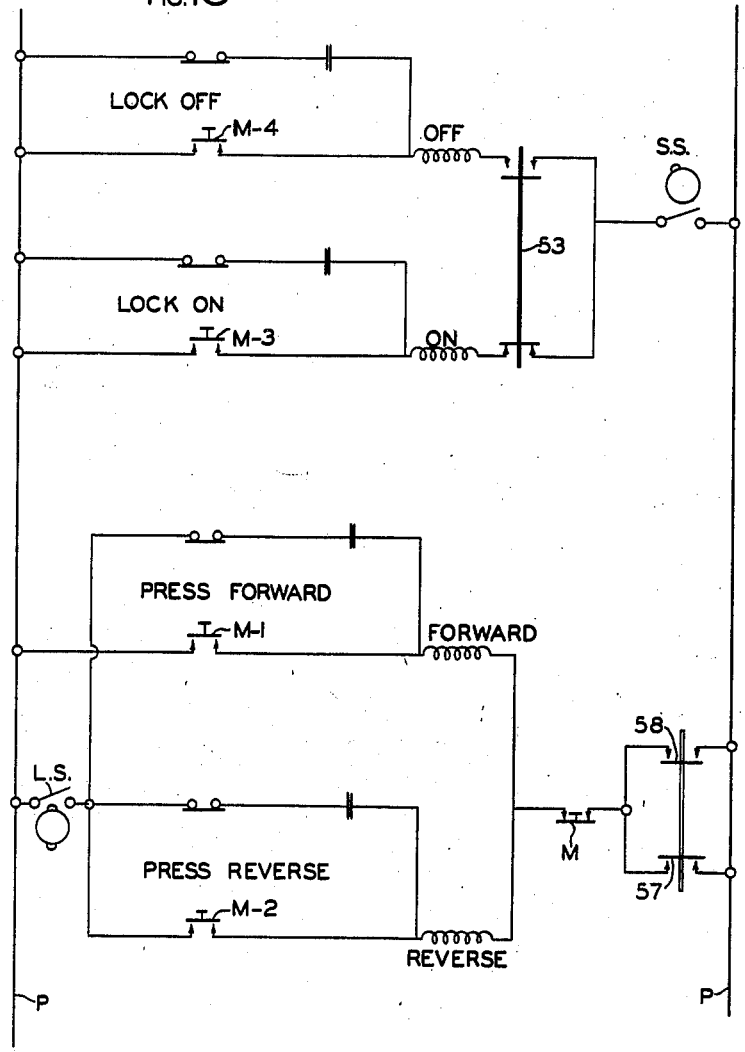

Patented Apr. 11, 1944

2,346,519

UNITED STATES PATENT OFFICE 2,346,519

PLATEN PRESS

Henning T. Tornberg, Akron, Ohio, assignor to National Rubber Machinery Company, Akron, Ohio, a corporation of Ohio Application September 7, 1940, Serial No. 355,770

7 Claims. (Cl. 18—17)

This invention relates to platen or molding presses for indurating, curing, or vulcanizing rubber or other plastic materials under heat and pressure.

The general purpose of the invention is to provide a dual press of this type which will be simple in operation and economical to build and avoiding the use of complicated devices for operating the platens, molds, or other members of the press which devices have heretofore been found necessary in this art.

The foregoing and other purposes of the invention are attained in the platen press illustrated in the accompanying drawings and described below. It is understood that the invention may be embodied in other presses such as molding presses or the like adapted for dual operation.

Of the accompanying drawings:

Figure 1 is a side elevation of the improved press set for opening and closing of two lower cooperating platens, the open position of the press being indicated in chain-dotted lines.

Figure 2 is a similar view, partly broken away, showing the press set for opening and closing of the two cooperating upper platens of the press, the upper platen of the two lower cooperating platens and the lower platen of the two upper cooperating platens being a single or common intermediate platen, the operation of which is controlled by the mechanism shown.

Figure 3 is a plan view of the improved press.

Figure 4 is a front elevation thereof.

Figure 5 is a plan view broken away and with closure plates removed of the central portion of the press.

Figure 6 is a section along line 6—6 of Figure 5.

Figure 10 is a wiring diagram for the improved press.

Figure 7:
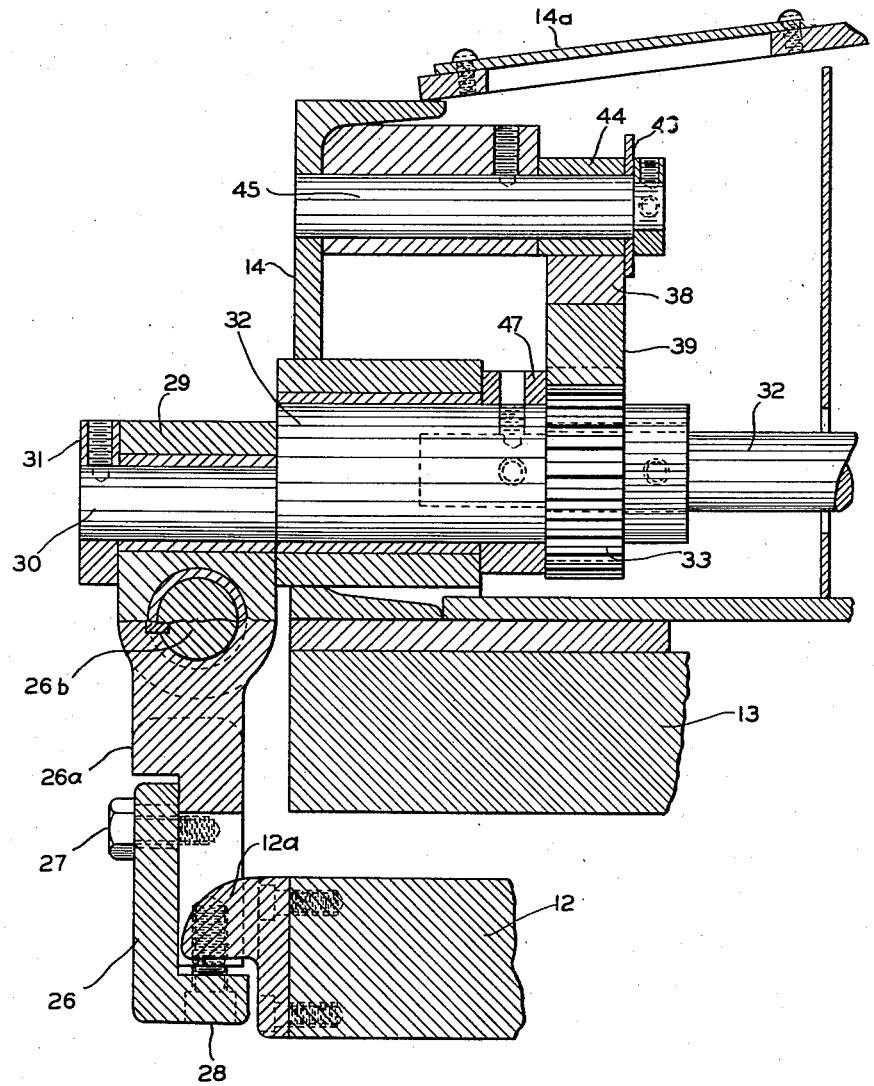
Figure 7 is a section on line 7—7 of Figure 4.

Referring to the drawings, the numeral 10 designates a suitable base or frame on which is mounted a lower platen or mold 11 above which is supported for movement toward and from the platen 11 an intermediate platen or mold member 12 which comprises preferably in a single element, the upper of the two cooperating lower platen 11 and 12 and the lower of two upper platens 12 and 13, the latter being secured to a press head 14. The platens or molds may be guided into proper registry with each other as by dowel pins 15 on the intermediate platen member 12 cooperating with apertures 16 in lower platen 11 and apertures 17 in upper platen 13.

The press head 14 may be hinged as at 18 in vertical slots 19 in hinged brackets 20 suitably mounted on base 10 so that the press may be adjusted for platens of different size or thickness, or to accommodate articles of different size, or thickness to be molded or pressed between the platens and also, if desired, to permit a degree of parallel opening and closing movements with relation to the work as the press is opened or closed.

The press head 14 is carried by suitable operating mechanism for opening and closing the press such as side arms 21, 21, having vertical slots 22, 22 in their upper ends in which are guided bearing blocks 23, 23 in which the press head 14 is pivoted as at 24, 24, relative movement of the bearing blocks 23 upwardly in the slots 22 being adjustably controlled as by set-screws 25, 25 to determine the spacing of the platens in the closed position of the press. The press is in open and closed positions when the press head 14 is in the chain-dotted and full-line positions, respectively, in both Figures 1 and 2.

The central platen or mold member 12 is arranged to be left associated with the lower platen 11 when the press is opened, by operation of the press operating mechanism to move press head 14 carrying the upper platen 13, to permit removal of the work from between the upper set of platens 12 and 13 and replacement with work to be treated in the press between the upper platens (see chain-dotted lines in Figure 2), and platen 12 is also arranged to be releasably connected to the press head 14 so as to be carried up with the press head and upper platen 13 thereon, upon opening of the press, as described above, to permit removal of finished work and replacement by unfinished work between the lower set of platens 11 and 12 (see chain-dotted lines in Figure 1).

To the end set forth in the preceding paragraph, platen 12 is provided with lugs 12ª, 12ª which may be arranged along the front and back edges thereof and with which are associated lifting hooks or clamps 26, 26 which as best shown in detail in Figure 7 may be removably mounted on arms 26ª as by means of bolts 27 and screws 28. Arms 26ª may be pivoted at 26ᵇ (see Figure 1) on brackets 29 rotatably retained on eccentric pins 30 by collars 31, eccentric pins 30 being integral with or secured to shafts 32 carried by press head 14.

Shafts 32 have gears 33 thereon (at the front of the press) for adjusting opposite clamps 26 (see Figure 3) and the several shafts 32 are arranged to be rotated simultaneously to adjust all the clamps by means of a single hand wheel or equivalent shown at 34. This is secured to a screw, indicated at 35 (Figure 4) threaded into a rack bar 36 carrying a rack 37 and connected to a rack bar 38 carrying a rack 39, rack bar 38 being in turn connected by a bar 40 to a rack bar 41 carrying racks 42 and 43, the racks 37, 39, 42 and 43 meshing with gears 33 (Figures 4 and 7) and the several rack bars being guided and supported, with their racks in meshing relation with gears 33, by rollers 44, 44, which, as best seen in Figure 7, may be mounted to rotate about pins 45 secured in the press head 14 and having rack retaining collars 46 thereon, collars 47 on shafts 32 cooperating with collars 46 to guide the racks between rollers 44 and gears 33. It will be understood that clamps 26 are so adjusted that they will clear the under sides of lugs 12$^a$ when the press is closed, as shown in full lines in Figures 1 and 2, and so that they can be freely swung from platen-lifting position (Figure 7) to free positions (Figure 2).

The hooks or clamps are keyed by arms 26$^a$ to shafts 26$^b$ which are rotatable in brackets 29 and which preferably comprise single shafts 26$^b$ preferably extending through each set of clamps at the front and back of the press to pivot the clamps on the brackets 29.

The shafts 26$^b$ each has keyed thereon an arm 48, having a slidable and pivotal connection by a pin 49 with a slotted nut 50 threaded onto a shaft 51 which extends through the upper press head 14 (see Figures 1 and 3) the shaft 51 and nuts 50 at the front and back of the press being reversely threaded whereby rotation of shaft 51 will simultaneously actuate both sets of clamps 26 (front and rear) to and from clamping positions. Shaft 51 is suitably geared to a motor 52 arranged in the press head 14 (see Figure 6).

As shown best in Figures 5 and 6, the press head 14 constitutes a housing which may have removable cover plates 14$^a$ and 14$^b$ therein above the motor 52 and above a motor control limit switch arrangement comprising a control-block 53 threaded onto shaft 51 at 54 and having a suitable sliding bearing in the press head 14 at 55.

The control block 53 is arranged in association with a double-acting limit switch 56 for stopping motor 52 at the limits of travel of the clamps between engaging and disengaging positions with lugs 12$^a$, and block 53 may have arms 53$^a$ and 53$^b$ thereon for engaging the switch respectively at said limits. Safety switches 57 and 58 are preferably also associated with the control block 53 to be engaged respectively by arms 53$^c$ and 53$^d$ at the said limits so that the press motor cannot be actuated unless the clamps are fully released or fully positioned for engagement with lugs 12.

The press operating motor is shown at 59 and operates gears, one of which is indicated at 60 in Figure 1 (see Figure 4) to drive gears 61 on a crank-shaft 62 having cranks 63, 63 thereon at the side ends of the press (Figure 4) to which the side arms 21 are pivoted for opening and closing the press.

Figure 8:
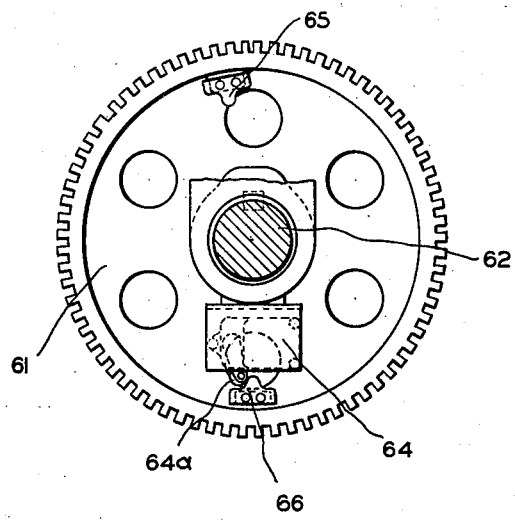
Figure 8 is a section on line 8—8 of Figure 4, showing a driving gear and switch controlled cams.
Figure 9:
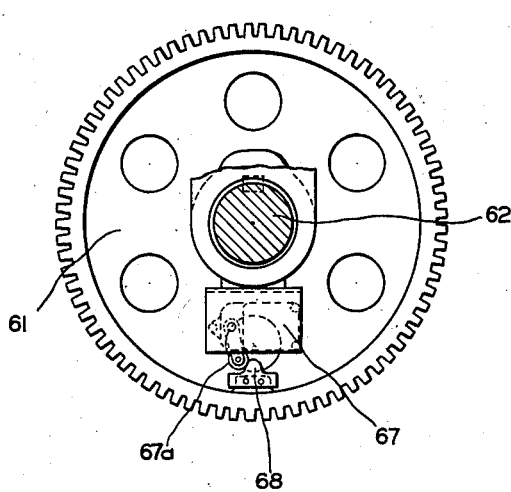
Figure 9 is a section on line 9—9 of Figure 4, showing a driving gear and a switch controlled by cams.

A double-acting motor-limit switch 64 (Figure 8) may be associated with one gear 61 which may have thereon two cams 65 and 66 for engaging the switch element 64$^a$ to stop the press in fully open and fully closed positions. A safety switch 67 may be associated with the other gear 61 (Figure 9) and a cam 68 may be arranged on said other gear 61 to engage actuating-element 67$^a$ of switch 67 for preventing operation of clamp-motor 52 when the press is not closed as shown in full lines in Figure 1, whereby the clamps 26 may not be released to allow platen 12 to drop from the open position thereof shown in chain-dotted lines in Figure 1, or from any intermediate position.

Referring to Figure 10, the power lines P, P to the improved unit may be connected up to the press motors, as shown, the "press forward" and "press reverse" (opening and closing control wiring as indicated being controlled by cams 65 and 66 as indicated diagrammatically at L. S. and the "lock-off" and "lock-on" wiring as shown being controlled by cam 68, as shown at S. S. The press may be manually controlled to open and close respectively by suitable switches M$^1$ and M$^2$ and the engaged and released positions of the clamps manually controlled by suitable switches M$^3$ and M$^4$. The double-acting clamp-motor limiting switch is indicated in the diagram at 56 and the safety switches 57 and 58 for controlling the press motor are indicated in the diagram by these numerals. A control for switches M$^1$ and M$^2$ is shown on the front of the press (Figure 4) at M and the controls for switches M$^3$ and M$^4$ are shown by these reference characters on the front of the press.

In operation of the press, the clamps 26 are engaged as shown in full lines in Figure 1 to hold the central platen 11 in association with the upper platen 13, whereby the press may be opened and closed, by starting press motor 59 which operates the press operating mechanism, for removal of finished work and replacement by unfinished work between platens 11 and 12, as shown in Figure 1. The clamps may then be released, as shown in full lines in Figure 2, and the press again opened and closed through the press operating mechanism for removal of finished work between platens 12 and 13 and for treating unfinished work between these platens, the released platen 12 remaining in association with lower platen 11 during this operation, as will be understood by reference to Figure 2.

The platens may be adjustably controlled for different thicknesses of work or the like by operating hand wheel 34 to accommodate clamps 26 for the different spacing of platens 11 and 12, the upper platen 13 being self-accommodating to different thicknesses by reason of the floating hinge pins 18 for the press-head 14.

The operations of the various mechanisms for engaging or releasing the clamps and for opening and closing the press will be understood from the description of the construction thereof in preceding paragraphs.

By the construction shown, expensive and complicated mechanisms to control an intermediate mold or platen member is avoided in dual presses of the type in which a plurality of molds or platens are arranged in superposed relationship.

Modifications of the invention may be resorted to without departing from the spirit thereof or the scope of the appended claims.

What is claimed is:

1. A dual press of the character described including lower, intermediate, and upper platen members, relatively movable press members supporting the lower and upper platen members, releasable means including relatively movable intermediate platen engaging elements on the upper platen member for connecting the intermediate platen member to the upper press member and means operable at will for relatively moving said elements to engage and disengage them, whereby the intermediate platen member may be moved to an open position with the upper press member or be permitted to rest upon the lower platen member or upon work mounted on the latter, means for relatively moving the press members to open and close the press, and means for preventing operation of the releasable connecting means to release the intermediate platen when the press is open with said intermediate platen connected in association with said upper press member.

2. A dual press of the character described including lower, intermediate, and upper platen members, relatively movable press members supporting the lower and upper platen members, releasable means including relatively movable intermediate platen engaging elements on the upper platen member for connecting the intermediate platen member to the upper press member and means operable at will for relatively moving said elements to engage and disengage them, whereby the intermediate platen member may be moved to an open position with the upper press member or be permitted to rest upon the lower platen member or upon work mounted on the latter, and means for preventing operation of said operating means to release the intermediate platen member except when the platen members are together in press-closed positions.

3. A dual press of the character described including a lower relatively fixed press member and an upper relatively movable press member, a platen on each of said members and an intermediate platen, relatively movable elements carried by the upper press member and said intermediate platen adapted to be releasably engaged to connect the intermediate platen to the upper press member, and means for relatively moving said elements at will to connect or disconnect said intermediate platen to said upper press member, whereby the intermediate platen may be connected to move with the upper press member or may be allowed to rest on the lower platen or upon work mounted on the latter, said releasable interengaging means comprising lugs on the intermediate platen, shiftable hook-like clamps on the upper press member for engaging said lugs and means on the upper press member operable at will for shifting said clamps to and from positions to engage said lugs.

4. A dual press of the character described including a lower relatively fixed press member and an upper relatively movable press member, a platen on each of said members and an intermediate platen, relatively movable elements carried by the upper press member and said intermediate platen adapted to be releasably engaged to connect the intermediate platen to the upper press member, and means for relatively moving said elements at will to connect or disconnect said intermediate platen to said upper press member, whereby the intermediate platen may be connected to move with the upper press member or may be allowed to rest on the lower platen or upon work mounted on the latter, said releasable interengaging means comprising lugs on the intermediate platen, shiftable hook-like clamps on the upper press member for engaging said lugs and means on the upper press member operable at will for shifting said clamps to and from positions to engage said lugs, and means operable at will for shifting said clamps to and from positions to engage said lugs, and means operable at will for shifting said clamps relative to said lugs for different thicknesses of work between the lower and intermediate platen members.

5. A dual press of the character described including a lower relatively fixed press member and an upper relatively movable press member, a platen on each of said members and an intermediate platen, relatively movable elements carried by the upper press member and said intermediate platen adapted to be releasably engaged to connect the intermediate platen to the upper press member, means for relatively moving said elements at will to connect or disconnect said intermediate platen to said upper press member, whereby the intermediate platen may be connected to move with the upper press member or may be allowed to rest on the lower platen or upon work mounted on the latter, including means for relatively moving the press members to open and close the press, and means for preventing operation of said last-named means to release the intermediate platen when the press is open with said intermediate platen connected in association with said upper press member.

6. A dual press of the character described including a lower relatively fixed press member and an upper relatively movable press member, a platen on each of said members and an intermediate platen, relatively movable elements carried by the upper press member and said intermediate platen adapted to be releasably engaged to connect the intermediate platen to the upper press member, and means for relatively moving press member, and means for relatively moving said elements at will to connect or disconnect said intermediate platen to said upper press member, whereby the intermediate platen may be connected to move with the upper press member or may be allowed to rest on the lower platen or upon work mounted on the latter, said press including means for preventing operation of said relatively movable elements to disconnect said intermediate platen from the upper press member except when the upper and lower press members are in press-closed positions.

7. A dual press of the character described including three platen members, relatively movable press members supporting two of the platen members with the third platen member between them, releasable means for connecting the intermediate platen member to a movable press member to move therewith, means operable at will to engage and disengage said releasable means, said releasable means when disengaged permitting the intermediate platen member to remain in association with one of the other platen members or with work mounted therein, and when engaged connecting the intermediate platen member with the other platen member to move therewith when the press is open, and means for preventing operation of said connecting means to disconnect the intermediate platen member except when the three platen members are together.

HENNING T. TORNBERG.